G. WENZELMANN.
TRACTOR FENDER.
APPLICATION FILED MAY 10, 1919.
1,375,193.
Patented Apr. 19, 1921.
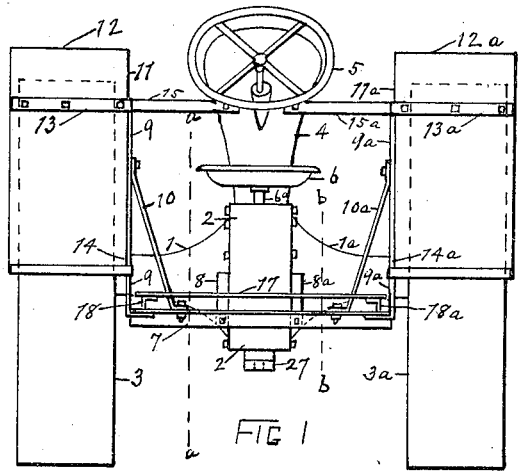
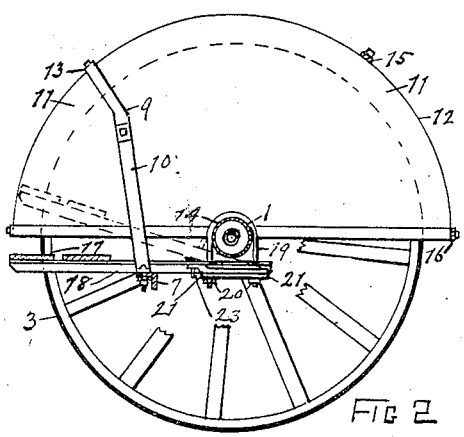
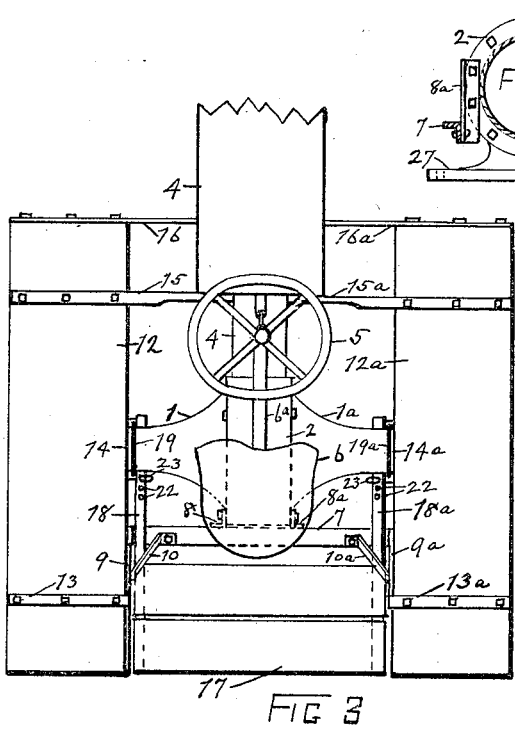
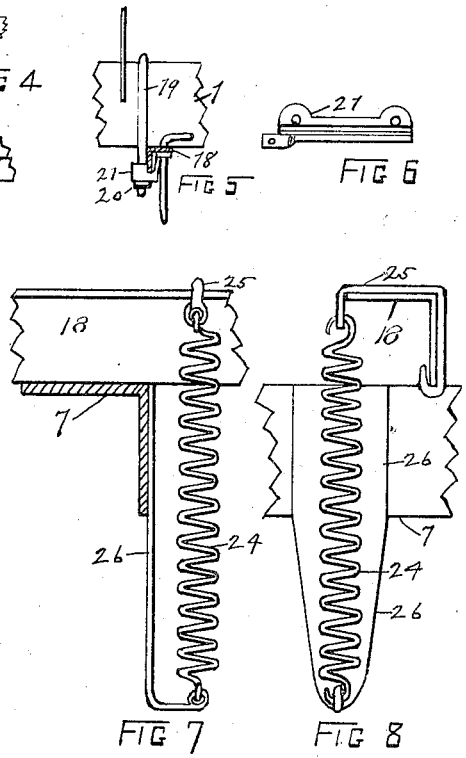
INVENTOR
Gustave Wenzelmann

UNITED STATES PATENT OFFICE.

GUSTAVE WENZELMANN, OF GALESBURG, ILLINOIS.

TRACTOR-FENDER.

1,375,193.   Specification of Letters Patent.   Patented Apr. 19, 1921.

Application filed May 10, 1919. Serial No. 296,218.

*To all whom it may concern:*

Be it known that I, GUSTAVE WENZELMANN, a citizen of the United States, residing at Galesburg, in the county of Knox and State of Illinois, have invented a new and useful Improvement in Tractor-Fenders.

This invention relates to an attachment for tractors to guard against accidents to the operator. Its further object is to provide safeguards of such form and location as to be thoroughly effective and, at the same time, not obstruct but improve the accessibility of the tractor seat.

Protection of this nature is of great importance on account of the extraordinary danger to a person riding on the seat, between the powerful main traction wheels, and just ahead of the plow, harrow or whatever is being drawn by the tractor.

Various devices have been tried, but, as far as I know, have proved to be more or less inefficient besides being objectionable on account of obstructing passage to and from the tractor seat.

In the drawings herewith, Figure 1 is a rear view of my device attached to a tractor; Fig. 2 is a sectional view, on line $a-a$ of Fig. 1; Fig. 3 is a plan view of my device and the rear part of a tractor to which it is attached. Fig. 4 is an enlarged detail of section at $b-b$ of Fig. 1; Figs. 5 and 6 show means of attaching the adjustable floor; Figs. 7 and 8 illustrate a controlling spring for the said floor.

Each part is designated by the same reference character wherever shown or described. 1, $1^a$ represent the housings of the rear axles of a tractor; 2 is the gear housing, partly formed by the enlarged ends of housings, 1, $1^a$; 3, $3^a$ are the main traction wheels; 4 is a portion of the tractor body, 5 is the steering wheel, 6 is the seat and $6^a$ is the spring on which seat 6 is mounted.

A main cross bar 7, preferably of L-shape in cross section, is rigidly attached to the rear portion of housing 2, by means of hangers 8, $8^a$, the top of cross bar 7 being placed at a somewhat lower level than the bottom of the small part of housings 1, $1^a$, for the purpose later explained. 9, $9^a$ are uprights erected at the ends of bar 7 and provided with braces 10, $10^a$. Sheet metal guards 11, $11^a$, substantially semicircular in outline, are placed near, but not touching the inner edges of wheels 3, $3^a$, respectively, and provided with wide semicircular flanges 12, $12^a$, covering but not touching the upper half of the wheels 3, $3^a$, room being allowed for attaching to said wheels the usual traction lugs. Guards 11, $11^a$ are firmly attached to, and stiffened and supported by uprights 9, $9^a$ respectively. Uprights 9, $9^a$ are extended to the periphery of guards 11, $11^a$, and are bent over at right angles, forming bars 13, $13^a$, extending transversely of flanges 12, $12^a$ which are securely attached thereto. Braces 15, $15^a$ and 16, $16^a$ connect the forward parts of guards 11, $11^a$ to body 4 of the tractor, said guards being thereby further stiffened and held in proper relation to wheels 3, $3^a$.

A floor 17 is provided, back of main cross bar 7, fitting quite loosely between guards 11, $11^a$ and capable of being tilted, as shown by dotted lines in Fig. 2. Floor 17 is supported on bars 18, $18^a$, said bars being extended forward above cross bar 7 and under housings 1, $1^a$, said cross bar 7 being placed in its low position for this purpose. The forward ends of floor bars 18, $18^a$ are loosely hinged to housings 1, $1^a$, by means of U-bolts 19, $19^a$ provided with nuts 20, arranged to support saddle washers 21, in which bars 18, $18^a$ are slidably seated. Holes 22, suitably spaced, are provided near the forward ends of bars 18, $18^a$ and a hole is also provided in each of the saddle washers 21, adapted to register with any one of holes 22, allowing the insertion of pin 23, which prevents bar 18 from sliding in washer 21. This device is shown in detail, as applied to bar 18, in Figs. 2, 5 and 6. Bar $18^a$ also has its supporting washer 21, holes 22 and pin 23. By this means floor 17 can be adjusted forward or backward and securely held in the desired location. Saddle washers 21 may be firmly clamped in place, but the intention is that they remain loose enough to allow the rear ends of bars 18, $18^a$ and floor 17 thereon to be raised, giving free access to draw-bar 27 of the tractor. The looseness of saddle washers 21 also permits the sliding of bars 18, $18^a$, when pins 23 are removed in adjusting the position of floor 17.

An extensible spiral spring 24 is attached, at its upper end, to floor bar 18, by means of slidable clip 25, this attachment being made slidable to allow proper positioning in case of the above described adjustment of floor 17. The lower end of spring 24 is attached to arm 26, extending downward and forward from main cross bar 7, directly below floor bar 18 and of proper length to give moderate tension to spring 24, thus providing yielding resistance to the raising of floor 17. Preferably the work of spring 24 is divided between two such springs, one acting upon floor bar 18 and the other upon floor bar 18ᵃ and thus distributing the tension to both sides of the platform equally, without torsional strain on the parts.

The usefulness and convenience of my device will be readily understood. Guards 11, 11ᵃ, with flanges 12, 12ᵃ prevent the operator from falling upon or into the upper parts of wheels 3, 3ᵃ of the tractor; and floor 17 coacts with said guards 11, 11ᵃ, by keeping the operator away from the lower parts of said wheels. Floor 17 also makes it impossible for the operator to fall between the tractor and the plow, harrow or other machine being drawn by it.

Floor 17 further provides a convenient step for the use of the operator in mounting to seat 6, and it may also be utilized, in connection with guards 11, 11ᵃ and their flanges 12, 12ᵃ, as a convenient and safe place for an instructor to stand while his pupil learns to operate the tractor.

The tiltability of floor 17 has already been explained. Besides the advantage mentioned of being able to raise this floor to give better access to draw-bar 27, and its connections, the upward yielding construction permits floor 17 to be raised automatically if more room is needed for the plow beam or other machine part in turning, or in case any part of a machine being drawn by the tractor extends under floor 17 and has a tendency to be raised, with relation to the tractor in passing uneven ground or otherwise.

Another important advantage of my device is that the use of cross bar 7 provides a support for floor bars 18, 18ᵃ, between their point of flexible and adjustable attachment to housings 1, 1ᵃ and floor 17, carried by them; besides providing a convenient and non-obstructing base for the erection of uprights 9, 9ᵃ and braces 10, 10ᵃ. Further it will be seen that the use of rigid cross bar 7 makes it possible to provide efficient braces 10, 10ᵃ for wheel guards 11, 11ᵃ without seriously obstructing the operator's passage to seat 6 on the tractor. This is done, as shown in Fig. 1, by spacing the attachment points of said braces 10, 10ᵃ a comparatively short distance from the bases of uprights 9, 9ᵃ. It has been found practicable and desirable to make the base of the triangle, formed by these parts, from one fourth to one third as long as the altitude.

While showing the construction so far found preferable, I do not wish to be understood as limiting my claims to the special forms and relation of parts of my device herein shown and described.

What I claim is:—

1. A device of the character described comprising guards over the top and inside upper portions of the main wheels of a tractor, a floor covering more or less of the space between said wheels guards and back of the rear axle of said tractor, said floor being adjustable and tiltable, and means for attaching and supporting said parts.

2. A device of the character described comprising a main cross bar, rigidly attached behind and somewhat below the housing of the rear axle of a tractor; braced uprights erected at the ends of said bar; a sheet metal fender attached to, and stiffened and supported by, each of said uprights, said fenders guarding the upper portion of the main wheels of the tractor; and an adjustable cantaliver floor, supported by coaction of said cross bar and said axle housing, and adapted to serve as a mounting step for the operator as well as a guard for the lower part of the main wheels and the space between them back of said main cross bar.

3. A device of the character described comprising a substantially horizontal main cross bar, hangers adapted to suspend said bar in rigid relation to and somewhat below the rear portion of the gear housing of a tractor, uprights erected at the ends of the cross bar, and a brace from the cross bar to the upper portion of each upright, said braced uprights being adapted to stiffen and assist in supporting wheel fenders attached thereto; and, in combination with the foregoing, a floor substantially on a level with the rear axle of the tractor and capable of being tilted, manually or automatically between said wheel fenders.

4. A device of the character described comprising the parts and combination of the preceding claim, and in further combination therewith, two supporting bars for said floor, one near each fender, each of said supporting bars being extended forward above the main cross bar and still further forward below the housing of the rear axle; and means adapted to retain the forward portion of said supporting bars in hinged engagement with said axle housing, and to permit the rear part of said supporting bars and the floor thereon to be raised manually, allowing access to parts below said floor, as and for the purpose explained.

5. In a device of the character described, a cantaliver floor, covering and guarding more or less of the space between the main wheel guards of a tractor, back of the main axle; means for hingedly and adjustably attaching said floor to the housing of said axle means adapted to support said floor in a substantially horizontal position and means adapted to yieldingly assist gravity in maintaining said position.

6. In a device of the character described, a cantaliver floor covering and guarding more or less of the space between the main wheel guards of a tractor, back of the main axle; means for hingedly attaching said floor and means for supporting said floor in a substantially horizontal position, said means being adapted to permit said floor to be tilted manually or automatically.

In testimony whereof I affix my signature.

GUSTAVE WENZELMANN.